Patented Jan. 25, 1944

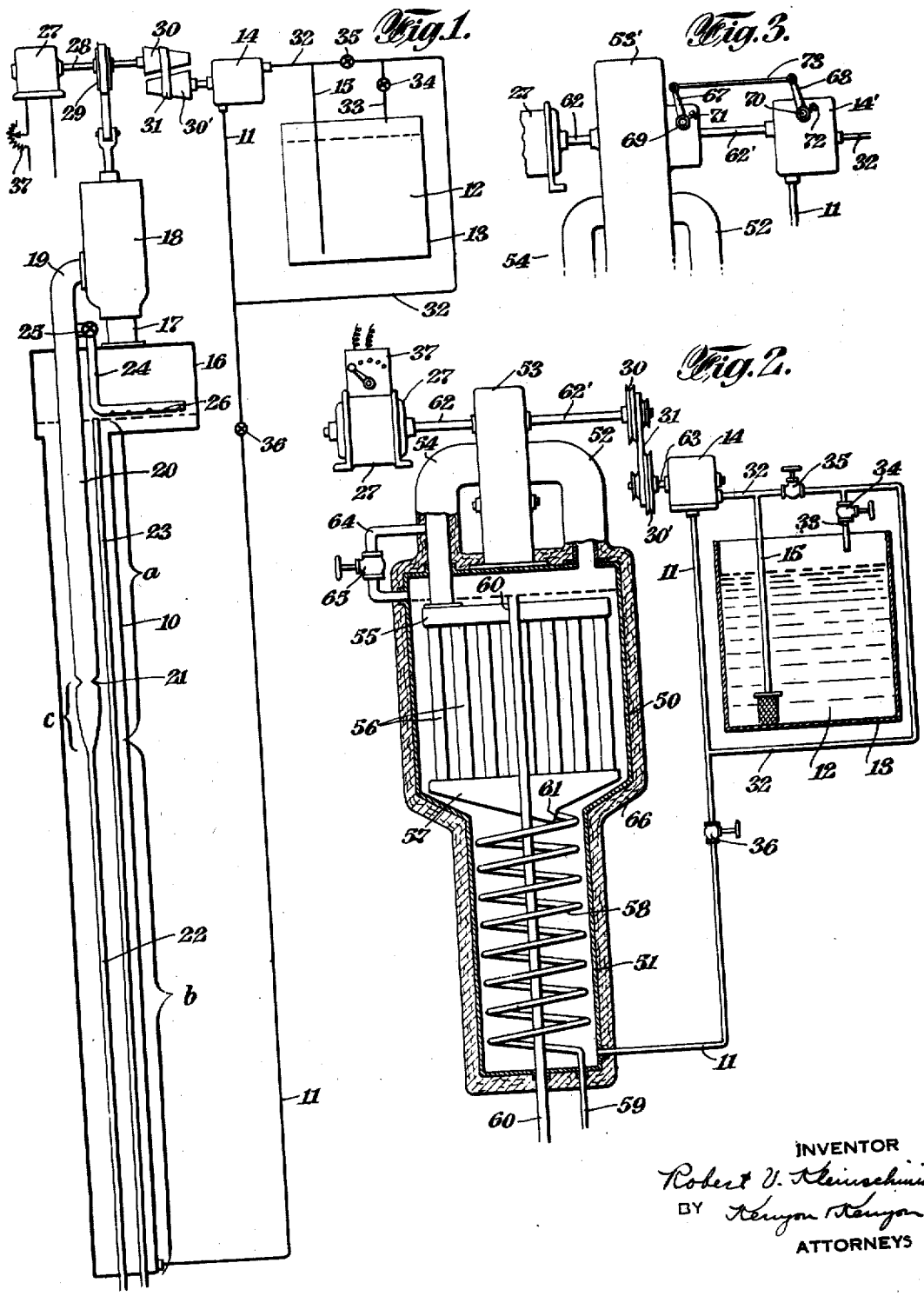

2,339,862

UNITED STATES PATENT OFFICE 2,339,862

APPARATUS FOR AND METHOD OF DISTILLATION

Robert V. Kleinschmidt, Stoneham, Mass., assignor to Arthur D. Little, Inc., Cambridge, Mass., a corporation of Massachusetts Application December 23, 1940, Serial No. 371,298

17 Claims. (Cl. 202—75)

This invention relates to improvements in apparatus for and method of separating components of a fluid mixture of two or more substances by reason of their difference in boiling point or volatility. More particularly, my apparatus and process are applicable to those cases where both the initial mixture and the separated components are liquids during some portion of the process, but these liquids may be more or less concentrated solutions of solids, liquids or gases in liquids or liquid mixtures of materials normally in solid or gaseous form in the pure state. My apparatus and process relate generally to what is commonly referred to as distillation, fractionation, rectification, evaporation, concentration, and the like, which are characterized by the evaporation of a portion of a liquid mixture. Any such liquid mixture is referred to herein as a solution, and any such operation is referred to herein as distillation, for purposes of brevity.

It is a purpose of the present invention to facilitate the control of a distillation operation wherein vapors evolved from a solution are compressed and brought into out-of-contact heat exchange relation with solution in a vaporization chamber or zone so that energy of compression may be utilized in causing further solution to be evaporated and thereby maintain a continuous process. In carrying out such an operation, the compressed vapor, which is condensed in heat exchange with boiling solution, results in a condensate which is taken from the system, preferably in counterflow heat exchange relation with the solution entering the system, so as to preheat the solution in a preheating chamber or zone before it enters the vaporization zone.

In my Patents Nos. 2,185,595 and 2,185,596, I have described a distillation method and apparatus which can be operated continuously under constant conditions such as rate of distillation, amount and concentration of overflow, pressure on the feed valve, and efficiency of heat transfer surfaces. If it is desired to operate such apparatus under another set of conditions, it will normally be necessary to readjust the apparatus until desired operation is attained. This is due in part to the fact that there is a tendency for the portion of the heat exchanger tube which is condensing vapor to vary with the amount of vapor being condensed. The result is that at high rates of distillation there may be insufficient tubing left in the preheater zone to preheat the feed and cool the condensate to desired degree.

In the present invention, I have provided means whereby the condensing section can be sharply limited in length and the relations of flow, pressure drop and condensing surface are adjusted in the design and construction of the apparatus to automatically adjust the rate of condensation over a range of distillation rates. Moreover, I have provided feed control means that will automatically supply the correct predetermined amount of feed at all rates of distillation. In this way, I am able to provide a complete self-regulating system of distillation, which, in addition to requiring less attention during normal constant operation, permits a range of rates of distillation, while maintaining desired distillation conditions, merely upon varying the amount by weight of liquid in vapor form that is compressed by the compressor.

It is a feature of this invention that the rate of condensation of compressed vapor which is brought into out-of-contact heat exchange with solution in the vaporization zone is automatically controlled upon variation in the capacity of the compressor to discharge vapor under pressure relatively to the capacity of the condenser to condense the vapors at a given temperature differential between the condensing compressed vapors and the boiling solution in the vaporization zone. This automatic control may be effected, according to this invention, by causing the condensate resulting from condensation of the compressed vapor to flow through an orifice of limited cross-section, which has the effect of increasing the pressure on the uncondensed vapor undergoing condensation whenever the amount of compressed vapor discharged by the compressor is increased. In this manner, the temperature differential between the compressed vapor in the condenser and the boiling solution in the vaporization zone is increased, until the rate of condensation of the vapor is increased sufficiently to take care of the increased amount of vapor discharged by the compressor. It is to be noted that this is accomplished without materially changing the extent of the condensation zone in the apparatus. Any vapor which reaches the restricted orifice, being of much greater volume than the condensate, acts with a throttling action at the orifice so as to build up the pressure on the condenser side of the orifice, with the result above described.

It is a further feature of this invention that the rate of feeding solution to be distilled into the apparatus is automatically varied, depending upon the amount of vapor handled by the compressor, so that the capacity of the distillation unit can be varied merely by changing the capacity of the compressor and without need for manually adjusting the rate of feed once the desired conditions of the distillation operation are observed to have been established. This may be accomplished by actuating the compressor by suitable means and controlling the rate of feed by a pump or equivalent device by means coacting with means for varying the output of the compressor, so that whenever the output of the compressor is varied, the rate of feed supply is varied substantially proportionally.

Further features of this invention relate to the co-operation between the automatic control of the capacity of the condenser and of the rate of the feed, so that the distillation unit is fully automatic in all respects. Other features of this invention relate to supplemental means for controlling the rate of feed in a manner which is useful during the starting of the apparatus.

Further purposes, features and advantages of this invention will be apparent in connection with the following description of the illustrative embodiments of this invention which are shown in the accompanying drawing, wherein Figure 1 is a side elevational view, principally schematic, of a simple type of apparatus embodying this invention;

Fig. 2 is a side elevational view, partially in section and partially schematic, of a form of apparatus embodying this invention which is typical of apparatus appropriate for commercial installation; and Fig. 3 is a side elevational view partially schematic of a modified means for proportionally controlling the output of the compressor and pump in the system shown in Fig. 2.

Referring to Fig. 1, the distillation apparatus comprises a shell 10 into which solution to be distilled is introduced by line 11 that enters the shell 10 adjacent the bottom thereof. The solution 12 to be distilled may be contained in a reservoir 13 from which it can be pumped by pump 14 through line 15 having a mouth adjacent the bottom of reservoir 13. In this manner, the solution to be distilled is taken from the reservoir 13 and fed into the bottom of the shell 10 at a rate which is controlled by the rate of operation of the pump 14. The pump 14 is preferably of a positive displacement type so that the rate of feed may be controlled as accurately as possible depending upon the rate of operation of the pump. At the top of the shell 10 is a vapor separator 16 from which vapor is taken by line 17 to the compressor 18, which may be of any suitable type such as a piston type compressor or a rotary compressor; e. g., a rotary compressor of the Roots Connersville type. Preferably the compressor is of a positive displacement type so that the amount by weight per unit of time of liquid in vapor form compressed by the compressor may be controlled as accurately as possible, depending upon the rate of operation of the compressor. In the compressor 18 the vapor is compressed to a pressure such that its condensing temperature is above the boiling point of solution to be vaporized in the upper portion of the shell 10. The compressed vapor is discharged from the compressor by line 19 and enters the condenser heat exchanger 20 in out-of-contact heat exchange with solution within the shell 10. Adjacent the lower portion of the condenser 20 is a restricted orifice 21, the purpose and operation of which will be described more in detail hereinbelow. In order to withdraw condensate resulting from condensation of vapor in the condenser 20, the line 22 is provided, which acts as a cooling heat exchanger and which directs the outflowing condensate in counterflow heat exchange with solution introduced into the shell 20 through line 11 and serves to preheat the incoming solution in the lower preheater portion of the shell 10 before the solution reaches the upper vaporization portion of the shell 10. The normal liquid level in the distillation apparatus is determined by the level of overflow line 23, the mouth of which is slightly above the lower part of the vapor separator 16. The overflow line 23 preferably extends downwardly through the shell 10 so that sensible heat of the withdrawn concentrated solution may be given up by heat exchange with incoming fresh solution, thereby increasing the efficiency of the system. In order to facilitate the starting of the apparatus, a by-pass line 24 controlled by valve 25 is provided, the by-pass line 24 preferably having an outlet adjacent the normal liquid level of liquid in the still, in the manner described more fully in my Patent No. 2,185,596 and which is exemplified herein by the outlets 26 that are slightly above the normal liquid level of solution in the still. In normal operation of the device, the valve 25 is maintained in closed position.

The compressor 18 is operated by a motor 27 which drives the shaft 28. The rate of output or capacity of the compressor for compressing vapor is proportional to the speed of rotation of the shaft 28 driven by the motor 27. The compressor is operated from shaft 28 by any suitable operative actuating mechanism 29. The pump 14 is also operated by the motor 27 through suitable positive connecting means such as the complementary conical pulleys 30 and 30' and belt 31. By using conical pulleys 30 and 30' and belt 31, the relative rate of operation of the compressor 18 and of the pump 14 can be adjusted as desired and can be maintained at any suitable setting. After the desired relative operation of the compressor 18 and the pump 14 has been determined, the setting of the belt 31 so as to maintain the desired rate of operation normally is maintained undisturbed during the distillation operation and during any change in the rate at which the distillation operation is carried on.

A by-pass line 32 leads from the feed line 11 so that solution discharged from the pump 14 can be recirculated to the pump. If desired, solution by-passed through line 32 can be by-passed back to the reservoir 13 through line 33 controlled by valve 34. Alternatively, the solution by-passed through line 32 can be returned directly to the pump 14 by opening valve 35 and closing valve 34. In either event, the by-passed solution is to be regarded as being returned to the suction side of the pump 14.

The operation of the distillation apparatus above described may be illustrated as follows. When it is desired to institute a distillation operation, the motor 27 is started, which simultaneously operates the compressor 18 and the pump 14. Solution 12 is taken from the reservoir 13 and caused to flow into the shell 10 until it starts to overflow from the overflow line 23. The valves 34 and 35 are then opened (either one or the other or both), so that the solution pumped by the pump 14 will be recycled and will not cause an excessive amount of undistilled solution to flow from the still through overflow line 23. If desired, the rate of flow in the feed line 11 may be controlled by the valve 36 so as to ensure the proper by-passing of the solution pumped by the pump 11. At the same time, the valve 25 is opened so that gaseous fluid comprising air and vapor in the vapor separator 16 will be recycled by the compressor 18 until it is warmed and until the vapor content is increased so that the amount of condensing vapor is sufficient to bring the solution in the upper part of shell 10 to boiling temperature. When the amount of vapor in the gaseous fluid that is withdrawn by the compressor is sufficient to boil the solution in the upper part of shell 10 and maintain a continuous distillation operation, the valve 25 in the by-pass line 24 is closed and the valves 34 and 35 in the by-pass line 32 are also closed. The valve 36 in the feed line 11 is, of course, set in open position.

The rate of operation of the pump 11, if not previously adjusted as a result of prior operation of the apparatus, may be adjusted so that the solution to be distilled will be brought to proper concentration before being discharged through the line 23. This can be done by adjusting the position of the belt 31 on the conical pulleys 30 and 30'. When the belt 31 has been brought to the desired setting and distillation conditions for continuous operation have become established, it is apparent that the pump 14 will supply fresh solution to be distilled so that the amount by weight per unit of time of the solution will be proportional to the amount by weight per unit of time of liquid in vapor form compressed by the compressor 18. While the rate of operation of the compressor 18 remains constant, the rate of feed will likewise remain constant so that the rate of feed will be appropriate for achieving the desired extent of concentration of solution being distilled. If, however, the rate of operation of the compressor is varied by varying the speed of the motor 27, the rate of feed will be automatically changed by the change in rate of operation of the pump 14 while still maintaining substantially the same desired ratio between the amount by weight per unit of time of solution fed into the system by the pump and the amount by weight per unit of time of liquid in vapor form compressed by the compressor. For example, if it is desired to increase the output of the still as a whole by increasing the output rate of the compressor, an increased amount of solution will be automatically introduced into the still so as to take care of the increased amount of vapor withdrawn from the vapor separator 16 and condensed in the condenser 20, thereby maintaining the functioning of the device constant notwithstanding the increased rate of output of the still. Conversely, if the rate of operation of the compressor 18 is decreased, the rate of feed by pump 14 will likewise be decreased automatically.

In the operation of the device, it is also pointed out that the capacity of the condenser 20 is varied automatically upon varying the output of the still. This is accomplished by providing the restricted orifice 21 adjacent the lower part of the condenser 20. The orifice 21 automatically controls the capacity of the condenser 20 in the following manner.

During the operation of the apparatus, the vapor compressed by the compressor 18 is condensed in the condenser 20, part of the vapor ultimately reaching the orifice 21. The orifice 21 is of sufficient size to pass the total amount of liquid resulting from condensation of all the vapor compressed by the compressor. However, the orifice 21 has insufficient cross section to permit more than a small amount of vapor to pass therethrough. This results from the fact that the volume of the vapor is many times the volume of the condensate. Due to the presence of the orifice 21, the condensing vapor tends to come down to the orifice 21 but does not pass thereby in more than a very small amount. Depending upon the amount of condensing vapor which reaches the orifice 21, the pressure in the condenser 20 is increased or decreased, the pressure being greater the greater the amount of vapor which reaches the orifice 21. This results in automatic control, inasmuch as whenever the amount of vapor discharged from the compressor 18 is increased, the pressure in the condenser 20 is increased due to the throttling action of the orifice 21, thereby increasing the temperature differential between the temperature of condensing liquid in the condenser 20 and the temperature of the boiling liquid in the vaporization zone of the still. This greater temperature differential increases the rate of condensation until a sufficient amount of the vapor is condensed so that all the condensate nearly free of vapor can pass through the orifice 21. Conversely, if the rate of operation of the compressor is decreased, the pressure in the condenser 20 will fall, so that the rate of condensation becomes lessened sufficiently to permit condensate to pass through the orifice 21 nearly free of vapor. As aforesaid, some of the vapor passes through the orifice 21, but the amount is very small and becomes condensed in the region c just below the orifice 21 in the vaporization zone. The condensation zone is indicated as a in the drawing and extends down through the vaporization zone or chamber of shell 10 and also takes in the region c just referred to. The condensate then passes down through the cooling heat exchanger which is in the preheating zone or chamber of the still, which is indicated as b.

The amount by weight of vapor which is permitted to pass the orifice 21 is very small and is usually less than two per cent of the total weight of liquid in vapor form compressed by the compressor. Normally, the orifice is such that only about a fraction of one per cent of the total weight of liquid in vapor form compressed by the compressor passes the orifice. In normal operation, however, some of the uncondensed vapor reaches the orifice 21 and a small amount in the order above mentioned passes therethrough so that the variations in pressure of vapor on the compressor side of the orifice will be maintained in approximately proportional relation to the amount by weight per unit of time of liquid in vapor form compressed by the compressor notwithstanding variations in said amount compressed by the compressor and/or variations in the capacity of the condenser to condense vapors in contact therewith. After any uncondensed vapor passes through the orifice, the pressure thereon and on condensate with which it is commingled is reduced and the residual vapor soon becomes condensed. When, for example, the outlet for the condensate is open to the atmosphere, the pressure adjacent the orifice on the outlet side thereof is normally still somewhat above atmospheric pressure, so that there will be some pressure drop in the cooling heat exchanger which can be utilized in maintaining a desired high heat exchange efficiency in the cooling heat exchanger.

It is apparent from the foregoing that the improvements of this invention make the apparatus self-regulatory. The rate of feed is regulated so as to correspond with the rate at which the compressor withdraws vapor and compresses it. Likewise, the condenser in the condensation zone for the compressed vapor and in the vaporization zone for the liquid to be distilled is self-regulatory by the orifice 21 while preserving the proper relationships between the vaporization and preheating zones of the apparatus.

It is to be understood that the showing in Fig. 1 is for the most part schematic. Thus, in usual practice, instead of using a single elongated condenser and preheater tube, these elements of the still are usually made of coil construction or the like so as to afford as much heat exchange surface as possible for a minimum of apparatus bulk. Moreover, any suitable source of power may be used. In the drawing, an electric motor 27 is shown, the speed of which can be controlled by a rheostat 37 or the like. Obviously, other sources of motive power may be used, such as a gasoline engine or other type of engine or motor. Further in this connection, the conical pulleys 30 and 30' and belt 31 are indicated as conventional speed-changing means, and any other speed-changing means may be employed. Preferably, the speed-changing means that is used is one which can be adjusted to the desired setting and the setting of which will remain undisturbed until it is desired to change the setting; e. g., when it is desired to treat a different type of solution or when it is desired to change the concentration of solution discharged from the distillation apparatus. With regard to the pump 14, a positive displacement pump, preferably of the rotary type, is used so that change in rate of actuation of the pump will result in a proportional change in the amount of solution delivered by the pump irrespective of the pressure on the suction or discharge sides of the pump over a moderate range. Moreover, any slip characteristics of the pump, preferably should correspond to the slip characteristics of the compressor 18, so that the vapor discharged by the compressor will remain proportional to the solution discharged by the pump upon proportional changes in the rate of actuation of the compressor and of the pump.

In Fig. 2, a more compact type of equipment is illustrated. The solution 12 to be distilled, reservoir 13, feed line 11, pump 14, line 15, by-pass line 32, line 33, and valves 34, 35 and 36 are the same in Fig. 2 as in Fig. 1 and are indicated by similar reference characters. The motor 27 and rheostat 37 are likewise indicated by similar reference characters.

In Fig. 2, the still comprises a vaporization chamber 50 and a preheating chamber 51. The vapor in the vaporization chamber may be withdrawn therefrom through line 52 into the compressor 53 which is indicated as a rotary compressor; e. g., a compressor of the well-known Roots Connersville type. The compressed vapor is discharged by line 54 into the header 55 in the vaporization chamber 50. The vapor is condensed in a plurality of tubes 56 arranged in parallel and which terminate in a lower header 57. The condensate flows down through the cooling heat exchanger coil 58 in the preheating chamber 51 and is discharged from the apparatus through line 59. The normal level of solution in the vaporization chamber 50 is controlled by the position of the upper mouth of overflow line 60 which passes down through the center of the distillation apparatus through the vaporization and preheating chambers. In this modification, the mouth 61 of line 58 provides a restricting orifice which serves to control the amount of vapor which can be discharged from the condenser heat exchanger consisting of the headers 55 and 57 and the condenser tubes 56.

The motor 27 drives the compressor 53 through the shaft 62, which shaft includes the portion 62' that rotates at the same speed as the shaft 62. The speed-changing mechanism between the shaft portion 62' and the shaft 63 which actuates the pump 14 is again shown as the conical pulleys 30 and 30', together with belt 31 for convenience in illustrating one type of speed-changing mechanism which may be employed.

Extending from the compressed vapor line 54 is a by-pass 64 which is controlled by valve 65. The by-pass 64 leads into the vaporization chamber of the still adjacent the normal liquid level of the solution therein. About the entire distillation apparatus is suitable insulating material 66 which preferably extends up around the lines 52 and 54 and about the compressor 53 so as to reduce heat losses as much as possible.

The operation of the device shown in Fig. 2 in instituting and maintaining distillation is essentially the same as that above described in connection with Fig. 1. It is to be noted, again, that the rate at which solution to be distilled is fed into the distillation apparatus varies proportionally with the rate at which vapor is withdrawn from the apparatus and directed under pressure into the condenser. Moreover, the mouth 61 of the line 58 during the operation of the apparatus acts as a restricting orifice which permits a very small amount of vapor to pass therethrough but acts as a throttling device to prevent any substantial increase in the amount of vapor passing therethrough so as to automatically increase the pressure of vapor in the condenser and thereby correspondingly increase the capacity of the condenser upon any increase in the action of the compressor in supplying compressed vapor to the condenser. In this manner, the entire apparatus is fully automatic notwithstanding changes in the rate of output of the distillation apparatus by virtue of change in rate of actuation of the motor 27.

It is also to be noted that the relative capacities of the compressor and the condenser portions of the apparatus may be varied in other ways. For example, if it is desired to adjust the apparatus so that the solution discharged from the apparatus is brought to a higher degree of concentration, this involves raising the solution in the still to a higher temperature, inasmuch as its boiling point is higher. The restricting action of the orifice 61 automatically takes care of any such change in conditions. If the boiling point of the solution to be distilled is thus raised, the capacity of the condenser is decreased, inasmuch as the temperature differential becomes decreased. Any such temporary decrease in capacity of the condenser will result, however, in an increased amount of vapor reaching the restricting orifice, thereby affording the throttling action above mentioned which results in the building up of the pressure in the condenser until the capacity of the condenser is increased to such point that substantially all of the vapor will become condensed before reaching the restricting orifice. In this way, the adjustment for regulating the system as a whole so as to preserve the proper relationship between the condensation and preheating zones is preserved. It is also possible, during the operation of the apparatus, that scale will form in the condenser, thereby decreasing the capacity of the condenser. If any such condition should arise, the pressure in the condenser will be appropriately increased due to the fact that any condensed vapor in substantial amount cannot pass the restricting orifice. In this way, notwithstanding the changes in the efficiency of the condenser, the functioning of the apparatus is automatically regulated so as to take care of the changed conditions.

It is not essential that the amount by weight per unit of time of liquid in vapor form compressed by the compressor and the amount by weight of solution supplied by the compressor be proportionally controlled merely by automatically varying the rate of operation of a pump proportionally to variations in rate of operation of the compressor, inasmuch as other coacting means may be employed for increasing and decreasing the amount by weight of liquid in the form of vapor compressed by the compressor and for substantially proportionally increasing and decreasing the amount by weight per unit of time of solution introduced into the system. Thus, by way of exemplifying one such modified means, instead of employing a compressor of a positive displacement type and a feed pump of positive displacement type, the output of each of which varies with the rate of operation, the compressor and pump can each be of a type the output of which can be varied while operating at substantially constant speed. Such a modification is exemplified in Fig. 3. In this modification, the compressor and the pump are indicated respectively by the reference characters 53' and 14'. The lines 11 and 32 connected with the pump correspond with the lines 11 and 32 shown in Fig. 2 and may be regarded as constituting a part of the system shown in this figure. Similarly, vapor lines 52 and 54 correspond with the vapor lines 52 and 54 shown in Fig. 2 and may be regarded as constituting a part of the system shown in this figure. The motor 27 and the shaft 62 including shaft part 62' which drive the compressor and pump may be operated at substantially constant speed. The output of the compressor (amount by weight per unit of time of liquid in vapor form compressed by the compressor) and the output of the pump (amount by weight per unit of time of solution discharged into feed line 11) may be varied proportionally by corresponding movement of parts 67 and 68 respectively, which are secured in rigid relation to shafts 69 and 70 respectively by set screws 71 and 72 respectively, the output being varied by movement of the parts 67 and 68, by any suitable means (not shown), of which many are known. The parts 67 and 68 are connected by a link 73 so that, when one of said parts is moved, the other will be moved in a corresponding manner and so that the outputs of the compressor and of the pump will remain at least approximately in the same proportional relation notwithstanding variations in the output. The desired setting for the output of the compressor in relation to the output of the pump can be adjusted by adjusting the position of part 67 and/or part 68 on shafts 69 and 70 by means of set screws 71 and 72 so that the system as a whole may function in the manner desired.

In apparatus embodying this invention, it is preferable that the heat transfer surface of the condenser between the compressor and the restricting orifice be about 5,000 times to about 100,000 times the area of the restricting orifice.

From a somewhat different point of view, it may be said that the construction and operation of the condenser part of the apparatus is such that distillation can be carried out at varying rates and the temperature differential between the condensing vapor and the solution being distilled will vary proportionally with variations in the rate of flow of solution through the system and proportionally with the rate of compression by the compressor of liquid in vapor form.

The method and apparatus of this invention are preferably employed when the temperature differential between the compressed vapor and the solution to be distilled is relatively low. For example, in the distillation of water, such as sea-water, the temperature differential between the compressed vapor and the boiling water may be as low as 5 to 15° F., and the apparatus is preferably operated so that a low temperature differential of the order mentioned is maintained. In distilling more concentrated solutions, however, such as brine solutions, the temperature differential may run about 30° F. or even 50° F. When utilizing such low temperature differentials, it is apparent that the rate of condensation can be increased materially by increasing the pressure of compressed vapor in the condenser, inasmuch as increased condensation temperature of much as a few degrees represents a very substantial percentage increase in the temperature differential between the condensing vapor and the solution being distilled.

In ordinary operation, at least about 50% of the solution fed into the system by the feed pump or equivalent device is vaporized and taken to the compressor and usually a considerably greater proportion of the solution that is fed into the system, e. g., about 70% to about 80%, is vaporized.

In order to indicate more clearly the operation of the present invention, we may consider the concentration of a brine such as is used for dehumidifying air in some air-conditioning systems. In this case, the humidity of the air is varied by varying the concentration of the brine used to absorb the water vapor from the air. Under varying conditions, brines might vary in their boiling points from 215° to 240° F. or even higher. In order to operate effectively, the pressure in the condensing tubes might vary from 5 pounds per square inch to as much as 20 pounds per square inch. Under such conditions, the restriction of flow at the outlet of the condensing section is of prime importance. This is especially true, since in air conditioning, it is important that the brine discharged from the distilling unit shall be as cool as possible, and hence that the steam separated from the brine should nearly all be condensed in the condensing section and not in the cooling coil of the preheater.

As an example of the opposite condition, we may take the case of distillation of sea-water. In this case, it is desirable to maintain the brine carrying the impurities as dilute as possible in order to retard the formation of scale on the heating surfaces. In this case, the rate of distillation may be varied by using the method of the present invention, while maintaining the overflow proportional to the feed, and at the same time maintaining the rate of condensation at the required value. Moreover, as scale does build up on the condensing tubes, the only effect on operation will be a gradual increase in pressure at the compressor discharge and a slight increase in power consumed. It will not be necessary to reduce the capacity of the unit.

While this invention has been described in connection with certain illustrative embodiments and examples thereof, it is to be understood that this has been merely by way of illustration and exemplification and that the scope of this invention is to be governed by the language of the following claims when construed in the light of the foregoing description of this invention.

I claim:

1. Distillation apparatus which comprises in combination a chamber adapted to contain a solution, a compressor adapted to compress a gaseous fluid comprising vapor, means arranged for directing a gaseous fluid from the interior of said chamber into said compressor for compression therein, heat exchange means arranged to maintain a fluid in out-of-contact heat exchange with solution in said chamber, means arranged for directing gaseous fluid compressed by said compressor into said heat exchange means in out-of-contact heat exchange with solution in said chamber, means for introducing solution to be distilled into said chamber, means for withdrawing concentrated solution from said chamber, and common control means for increasing and decreasing the capacity of the compressor to compress vapor of a given pressure and thereby increase and decrease the amount by weight of liquid in the form of vapor compressed by said compressor per unit of time and for increasing and decreasing the amount by weight of solution introduced into said chamber per unit of time while maintaining a predetermined proportional relation between the amount by weight per unit of time of liquid in vapor form compressed by said compressor and the amount by weight per unit of time of solution introduced into said vaporization chamber.

2. Distillation apparatus which comprises in combination a chamber adapted to contain a solution, a compressor adapted to compress a gaseous fluid comprising vapor, means arranged for directing a gaseous fluid from the interior of said chamber into said compressor for compression therein, heat exchange means arranged to maintain a fluid in out-of-contact heat exchange with solution in said chamber, means arranged for directing gaseous fluid compressed by said compressor into said heat exchange means in out-of-contact heat exchange with solution in said chamber, variable speed drive means for actuating said compressor at varying rates, means for introducing solution to be distilled into said chamber including a pump arranged for controlling the amount by weight of solution per unit of time introduced into said chamber, means for varying the rate of operation of said pump, and common control means for controlling the rate of operation of said compressor and the rate of operation of said pump, said common control means being arranged so that the amount by weight of solution per unit of time introduced into said chamber by the action of said pump will be maintained in substantially the same proportional relation with the amount by weight per unit of time of liquid in vapor form compressed by said compressor.

3. Distillation apparatus according to claim 2 wherein common control means comprises common drive means arranged to actuate said compressor and said pump at predetermined relative speeds.

4. Distillation apparatus according to claim 2 wherein said means for introducing solution into said chamber comprises a valve-controlled by-pass leading from the pressure side of said pump to the suction side of said pump.

5. Distillation apparatus according to claim 2 wherein said means for introducing solution into said chamber comprises a valve-controlled by-pass leading from the pressure side of said pump to the suction side of said pump, and which includes a valve-controlled by-pass leading from a point on the compression side of the compressor between said compressor and said heat exchange means to the interior of said chamber at a point adjacent the normal level of liquid in said chamber.

6. Distillation apparatus according to claim 2 which includes means for adjusting the relative rates at which said compressor and pump are actuated.

7. Distillation apparatus which comprises in combination a chamber adapted to contain a solution, a compressor adapted to compress a gaseous fluid comprising vapor, means arranged for directing a gaseous fluid from the interior of said chamber into said compressor for compression therein, heat exchange means arranged to maintain a fluid in out-of-contact heat exchange with solution in said chamber, means arranged for directing gaseous fluid compressed by said compressor into said heat exchange means in out-of-contact heat exchange with solution in said chamber, means including a movable part for vary responsive to movement of said part the capacity of the compressor to compress vapor of a given pressure, means for introducing solution to be distilled into said chamber, control means for controlling the amount by weight of solution per unit of time introduced into said chamber, and means responsive to movement of said part to actuate said control means so that upon moving said part the ratio of the amount by weight per unit of time of liquid in vapor from compressed by said compressor to the amount by weight of solution introduced into said chamber remains substantially constant.

8. Distillation apparatus according to claim 7 which includes means for adjusting the ratio between the amount by weight per unit of time of liquid in vapor form compressed by said compressor to the amount by weight per unit of time of solution introduced into said chamber.

9. Distillation apparatus which comprises in combination a chamber adapted to contain a solution, a compressor adapted to compress a gaseous fluid containing vapor, means arranged for directing a gaseous fluid from the interior of said chamber into said compressor for compression therein, condenser heat exchange means arranged to maintain a condensing vapor in out-of-contact heat exchange with solution in said chamber, means for directing gaseous fluid compressed by said compressor into said condenser heat exchange means in out-of-contact heat exchange with solution in said chamber, preheater heat exchange means arranged to maintain a fluid in out-of-contact heat exchange with solution to be distilled, means arranged for directing condensate resulting from condensation of vapor in said condenser heat exchange means from said condenser heat exchange means into said preheater heat exchange means, means arranged for introducing solution to be distilled into contact with said preheater heat exchange means and into said chamber including a pump arranged for controlling the amount by weight of solution per unit of time introduced into said chamber, means for withdrawing concentrated solution from said chamber, common control means for controlling the rate of operation of said compressor and the rate of operation of said pump, said common control means being arranged so that the amount by weight of solution per unit of time introduced into said chamber by the action of said pump will be maintained in substantially the same proportional relation with the amount by weight per unit of time of liquid in vapor form compressed by said compressor, and means for varying the capacity of said condenser heat exchange means comprising an orifice which is adjacent the outlet end of said condenser heat exchange means, the cross-sectional area of which is about 1/8,000 to 1/100,000 of the heat transfer surface of said condenser heat exchange means, and which restricts the outlet of said condenser heat exchange means so that upon varying the amount by weight per unit of time of liquid in vapor form compressed by said compressor from a first amount to a second amount the temperature differential between the condensing temperature of vapor in said condenser and the boiling point of solution in said chamber will be varied from a first temperature differential to a second temperature differential the ratio of which first and second temperature differentials being approximately the same as the ratio of said first and second amounts.

10. Distillation apparatus which comprises a preheating chamber, a vaporization chamber, means for introducing solution to be distilled into said preheating chamber and for directing it thence into said vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange with solution in said vaporization chamber, a cooler heat exchange means arranged to maintain liquid in out-of-contact heat exchange with solution in said preheating chamber, means arranged for directing condensate resulting from condensation of vapor in said condenser heat exchange means from said condenser heat exchange means into said cooler heat exchange means in out-of-contact heat exchange with solution in said preheating chamber, means arranged for withdrawing concentrated solution from said vaporization chamber, means for varying the amount per unit of time of vapor compressed by said compressor and supplied to said condenser heat exchange means, positive displacement feed control means arranged to control the amount per unit of time of solution introduced into said preheating chamber, motor means for actuating said compressor and said positive displacement feed control means, and common drive means for said feed control means and said compressor operatively connected with said motor means and coacting with said means for varying the amount per unit of time of vapor compressed by said compressor so that said amount by weight per unit of time of liquid fed by said feed control means varies approximately proportionally with variations in the amount per unit of time by weight of liquid in vapor form compressed by said compressor.

11. Distillation apparatus according to claim 10 which comprises means including a restrictive orifice between said condenser heat exchange means and said cooler heat exchange means for varying the temperature difference between the condensing vapor in the condensed heat exchange means and solution in said vaporization chamber approximately in direct proportion to variations in the amount by weight of liquid in vapor form compressed by said compressor and supplied to said condenser heat exchange means by varying the pressure of the vapor in said condenser heat exchange means.

12. A method of distillation which comprises feeding a solution to be distilled into and through a preheating zone and thence through a vaporization zone, vaporizing a portion of said solution in said vaporization zone, removing vapor evolved from said solution in said vaporization zone from said vaporization zone, compressing the removed vapor to a pressure at which the condensing temperature is above the boiling point of solution in said vaporization zone, supplying the compressed vapor in varying amount by weight per unit of time to a condensation zone in out-of-contact heat exchange relation with solution in said vaporization zone thereby condensing vapor to a liquid, withdrawing liquid from said condensation zone and passing it together with a small amount of uncondensed vapor to a cooling zone in out-of-contact heat exchange with solution in said preheating zone while simultaneously reducing the pressure on said liquid in passing from said condensation zone to said cooling zone to a pressure below condensation pressure but above atmospheric pressure while preventing the passage of more than a small fraction of the vapor therewith, and then cooling the withdrawn liquid and completing condensation of uncondensed vapor in said cooling zone in out-of-contact heat exchange with solution in said preheating zone.

13. A method according to claim 12 wherein the amount of solution per unit of time fed into said preheating zone is varied proportionally to the amount per unit of time compressed vapor supplied to said condensation zone.

14. A method of distillation which comprises causing vapor to be evolved from a solution in a vaporization zone, compressing the evolved vapor to a pressure at which the condensing temperature of the condensing vapor is substantially above the boiling point of said solution, bringing the compressed vapor into out-of-contact heat exchange with said solution and condensing substantially all of said vapor while in said heat exchange relation with said solution in said vaporization zone, feeding fresh solution into said vaporization zone, withdrawing concentrated solution from said vaporization zone, and varying the amount per unit time of liquid in vapor form compressed by said compressor to compress vapor capacity of the compressor while maintaining substantially constant a predetermined proportional relation between the amount per unit time of liquid in vapor form compressed by said compressor and the amount per unit time of fresh solution fed into said vaporization zone and while maintaining substantially constant a predetermined proportional relation between the amount per unit time of liquid in vapor form compressed by said compressor and the pressure to which the condensing vapor compressed by said compressor is subjected, said predetermined proportional relationship between the amount per unit time of liquid in vapor form compressed by said compressor and the pressure to which the condensing vapor compressed by said compressor is subjected being maintained by passing said condensate together with uncondensed vapor through a restrictive orifice which imposes a back pressure upon uncondensed vapor between said compressor and said orifice that varies depending upon the amount of condensate and uncondensed vapor reaching said orifice, the pressure upon the uncondensed vapor reaching said orifice being reduced in passing through said orifice.

15. In a method of distillation wherein vapor is evolved from a solution in a vaporization zone, the evolved vapor is compressed to a pressure at which the condensing temperature is substantially above the boiling point of said solution in said vaporization zone, the compressed vapor is condensed in out-of-contact heat exchange relation with said solution in said vaporization zone, fresh solution is introduced into said vaporization zone, concentrated solution is withdrawn from said vaporization zone, and condensate resulting from condensation of said compressed vapor is flowed in counterflow out-of-contact heat exchange relation in a preheating zone with fresh solution entering said vaporization zone, the steps comprising the passing of condensate resulting from the condensation of said compressed vapors through a restrictive orifice between said vaporization and preheating zones, and maintaining throughout the entire extent of the heat exchange surface at which condensing vapor is in out-of-contact heat exchange relation with solution in said vaporization zone between said compressor and said orifice a back pressure at which the condensing temperature of said condensing vapor is substantially above the boiling point of the solution in said vaporization zone while permitting a small amount of vaporized liquid to pass through said orifice together with said condensate, thereby causing said back pressure to vary depending upon the amount of condensate and uncondensed vapor reaching said restrictive orifice, and thereby causing to correspondingly vary the temperature at which the compressed vapor condenses prior to reaching said orifice, the pressure upon uncondensed vapor reaching said restrictive orifice being reduced in passing through said orifice, the condensation of uncondensed vapor passing through said orifice being completed at a lower pressure, and the amount of vapor passing through said restrictive orifice being at all times less than about two per cent. of the total weight of liquid in vapor form compressed by the compressor.

16. In a method of distillation wherein vapor is evolved from a solution in a vaporization zone, the evolved vapor is compressed to a pressure at which the condensing temperature is substantially above the boiling point of said solution in said vaporization zone, the compressed vapor is condensed in out-of-contact heat exchange relation with said solution in said vaporization zone, fresh solution is introduced into said vaporization zone, and concentrated solution is withdrawn from said vaporization zone, the steps comprising passing condensed compressed vapor through a restrictive orifice located on the far side of said vaporization zone from said compressor while passing a small amount of uncondensed compressed vapor through said orifice together with said condensate and maintaining the rate of operation of said compressor within the range wherein said restrictive orifice imposes a back pressure between said orifice and said compressor at which the condensing temperature of the compressed vapor is substantially above the boiling point of solution in said vaporization zone and while as aforesaid passing a small amount of uncondensed vapor through said orifice together with condensate condensed in said vaporization zone, thereby causing said back pressure to vary depending upon the amount of condensate and uncondensed vapor reaching said restrictive orifice and to correspondingly vary the temperature at which said compressed vapor condenses prior to reaching said orifice, the pressure upon uncondensed vapor reaching said restrictive orifice being reduced in passing through said orifice.

17. A method according to claim 16 wherein the temperature differential between the condensing vapor and the solution in the vaporization zone is between about 5° F. to about 50° F.

ROBERT V. KLEINSCHMIDT.